(12) United States Patent
Kienzle et al.

(10) Patent No.: US 9,135,293 B1
(45) Date of Patent: Sep. 15, 2015

(54) DETERMINING MODEL INFORMATION OF DEVICES BASED ON NETWORK DEVICE IDENTIFIERS

(71) Applicant: SYMANTEC CORPORATION, Mountain View, CA (US)

(72) Inventors: Darrell M. Kienzle, Vienna, VA (US); Matthew Cruz Elder, Germantown, MD (US); Nathan S. Evans, Sterling, VA (US)

(73) Assignee: Symantec Corporation, Mountain View, CA (US)

( * ) Notice: Subject to any disclaimer, the term of this patent is extended or adjusted under 35 U.S.C. 154(b) by 166 days.

(21) Appl. No.: 13/897,891

(22) Filed: May 20, 2013

(51) Int. Cl.
   *G06F 7/00* (2006.01)
   *H04W 24/00* (2009.01)
   *H04L 12/24* (2006.01)
   *G06F 17/30* (2006.01)

(52) U.S. Cl.
   CPC .................. *G06F 17/30424* (2013.01)

(58) Field of Classification Search
   USPC ........................ 707/609; 370/255, 400, 254
   See application file for complete search history.

(56) References Cited

U.S. PATENT DOCUMENTS

| | | | |
|---|---|---|---|
| 5,276,860 A | 1/1994 | Fortier et al. |
| 5,535,381 A | 7/1996 | Kopper |
| 5,555,371 A | 9/1996 | Duyanovich et al. |
| 5,559,991 A | 9/1996 | Kanfi |
| 5,835,953 A | 11/1998 | Ohran |
| 5,991,542 A | 11/1999 | Han et al. |
| 6,029,168 A | 2/2000 | Frey |
| 6,085,298 A | 7/2000 | Ohran |
| 6,101,585 A | 8/2000 | Brown et al. |
| 6,151,688 A | 11/2000 | Wipfel et al. |
| 6,360,330 B1 | 3/2002 | Mutalik et al. |
| 6,542,962 B2 | 4/2003 | Kodama et al. |
| 6,640,278 B1 | 10/2003 | Nolan et al. |
| 6,665,815 B1 | 12/2003 | Goldstein et al. |
| 6,714,952 B2 | 3/2004 | Dunham et al. |
| 6,829,688 B2 | 12/2004 | Grubbs et al. |
| 6,847,983 B2 | 1/2005 | Somalwar et al. |

(Continued)

FOREIGN PATENT DOCUMENTS

EP 0838758 A2 4/1998

OTHER PUBLICATIONS

"10GbE Technology and Device Characterization", Apr. 22, 2003, 21 pages, Agilent Technologies, Germany, http://cp.literature.agilent.com/litweb/pdf/5988-6960EN.pdf. [Retrieved Jan. 8, 2015].

(Continued)

*Primary Examiner* — Hung T Vy
(74) *Attorney, Agent, or Firm* — Rory D. Rankin; Meyertons, Hood, Kivlin, Kowert & Goetzel, P.C.

(57) ABSTRACT

A system and method for determining the model information of a device. A mapping database that maps a plurality of network device identifiers of a set of devices to model information of the devices may be automatically created. A request to determine model information of an unknown based on a network device identifier of the unknown device may then be received. The database may be analyzed to determine the model information of the unknown device. For example, the model information of the unknown device may be determined by extrapolating it based on the network device identifier of the device and the database information.

16 Claims, 11 Drawing Sheets

(56) References Cited

U.S. PATENT DOCUMENTS

| | | | |
|---|---|---|---|
| 6,865,655 B1 | 3/2005 | Andersen | |
| 6,880,051 B2 | 4/2005 | Timpanaro-Perrotta | |
| 6,910,112 B2 | 6/2005 | Berkowitz et al. | |
| 6,938,135 B1 | 8/2005 | Kekre et al. | |
| 6,976,039 B2 | 12/2005 | Chefalas et al. | |
| 8,219,769 B1 | 7/2012 | Wilk | |
| 8,844,041 B1 | 9/2014 | Kienzle et al. | |
| 8,891,404 B2 * | 11/2014 | Bertani et al. | 370/254 |
| 2003/0163495 A1 | 8/2003 | Lanzatella et al. | |
| 2003/0177149 A1 | 9/2003 | Coombs | |
| 2004/0268068 A1 | 12/2004 | Curran et al. | |
| 2005/0108593 A1 | 5/2005 | Purushothaman et al. | |
| 2005/0216788 A1 | 9/2005 | Mani-Meitav et al. | |
| 2010/0077250 A1 | 3/2010 | Koh et al. | |
| 2010/0208740 A1 * | 8/2010 | Furutani | 370/400 |
| 2010/0332657 A1 | 12/2010 | Elyashev et al. | |
| 2011/0252208 A1 | 10/2011 | Ali et al. | |
| 2011/0252271 A1 | 10/2011 | Frenkel et al. | |
| 2012/0059916 A1 * | 3/2012 | Ohashi | 709/222 |
| 2013/0016628 A1 * | 1/2013 | Bertani et al. | 370/255 |

OTHER PUBLICATIONS

"Vendor/Ethernet/Bluetooth MAC Address Lookup and Search", 2013, 1 page, Coffer.com, http://www.coffer.com/mac_find/. [Retrieved Jan. 8, 2015].

"How to Find the MAC Address of Your Computer", 8 pages, wikiHow, http://www.wikihow.com/Find-the-MAC-Address-of-Your-Computer [Retrieved Jan. 8, 2015].

"Mac Address Lookup", 2015, 2 pages, http://www.macvendorlookup.com/. [Retrieved Jan. 8, 2015].

"MAC address", 2015, 7 pages, Wikipedia, http://en.wikipedia.org/wiki/MAC_address. [Retrieved Jan. 8, 2015].

Reedy, Stu, "MAC to Manufacturer Cross-Reference", 1 page, http://curreedy.com/stu/nic/. [Retrieved Jan. 8, 2015].

"Lookup Mac Specs by Serial Number, Order, Model & EMC Number, Model ID @ EveryMac.com", 2014, 2 pages, EveryMac.com, http://www.everymac.com/ultimate-mac-lookup/. [Retrieved Jan. 8, 2015].

"My Devices—Look up info and keep track of your gadgets", 2013, 2 pages, PowerbookMedic, http://www.powerbookmedic.com/identify-mac-serial.php. [Retrieved Jan. 8, 2015].

"Chipmunk: Klantenservice", 1 page, http://www.chipmunk.nl/klantenservice/applemodel.html/. [Retrieved Jan. 8, 2015].

Kienzle et al., U.S. Appl. No. 13/749,667, entitled "Systems and Methods for Estimating Ages of Network Devices", filed Jan. 4, 2013, 38 pages.

"Windows DDK Glossary", http://msdn.microsoft.com/library/default.asp?url=/library/en-us/gloss/hh/gloss/glossary.sub.--628b1dfc-c8f0-4143-a4ef-0dddae24be4b.xml.asp, (3 pages). [Retrieved May 14, 2003].

"RepliWeb® R-1 User Guide—Version 3.1", RepliWeb, Inc., 2002, 26 pages.

"FilesX Xchange Restore™ For Microsoft Exchange Server", FilesX, Inc., Aug. 2003, 2 pages.

"Instructor Articles", VERITAS Education, Apr. 2003, 7 pages.

"EMC TimeFinder Family", EMC Corporation, Oct. 2004, 8 pages.

"EMC TimeFinder Local Replication: Improve Recovery-Point Objectives and Reduce Risk", EMC Corporation, Oct. 2004, 2 pages.

"Storage Area Networking: High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.

"Storage Management: Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, Dec. 2000, i-241 pgs.

Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001, pp. 1-21.

* cited by examiner

| MAC Address | Model Info in Database |
|---|---|
| 00-22-9B-B7-ED-5E | Sonova / XL |
| 00-22-9B-B7-ED-5F | |
| 00-22-9B-B7-ED-60 | Sonova / XL |
| 00-22-9B-B7-ED-61 | |
| 00-22-9B-B7-ED-62 | |
| 00-22-9B-B7-ED-63 | Sonova / XL |
| 00-22-9B-B7-ED-64 | |
| 00-22-9B-B7-ED-65 | |
| 00-22-9B-B7-ED-66 | |
| 00-22-9B-B7-ED-67 | |
| 00-22-9B-B7-ED-68 | |
| 00-22-9B-B7-ED-69 | Sonova / XL |
| 00-22-9B-B7-ED-6A | |
| 00-22-9B-B7-ED-6B | |
| 00-22-9B-B7-ED-6C | |
| 00-22-9B-B7-ED-6D | |
| 00-22-9B-B7-ED-6E | |
| 00-22-9B-B7-ED-6F | |
| 00-22-9B-B7-ED-70 | Sonova / XL |
| 00-22-9B-B7-ED-71 | |
| 00-22-9B-B7-ED-72 | |

MAC Address of unknown device

Extrapolated model information = "Sonova / XL"

FIG. 6

| MAC Address | Model Info in Database |
|---|---|
| 00-22-9B-B7-ED-5E | Sonova / GP |
| 00-22-9B-B7-ED-5F | |
| 00-22-9B-B7-ED-60 | Sonova |
| 00-22-9B-B7-ED-61 | |
| 00-22-9B-B7-ED-62 | |
| 00-22-9B-B7-ED-63 | Sonova / XL |
| 00-22-9B-B7-ED-64 | |
| 00-22-9B-B7-ED-65 | |
| 00-22-9B-B7-ED-66 | |
| 00-22-9B-B7-ED-67 | |
| 00-22-9B-B7-ED-68 | |
| 00-22-9B-B7-ED-69 | |
| 00-22-9B-B7-ED-6A | |
| 00-22-9B-B7-ED-6B | Sonova / GP |
| 00-22-9B-B7-ED-6C | |
| 00-22-9B-B7-ED-6D | Sonova / XR |
| 00-22-9B-B7-ED-6E | |
| 00-22-9B-B7-ED-6F | |
| 00-22-9B-B7-ED-70 | |
| 00-22-9B-B7-ED-71 | |
| 00-22-9B-B7-ED-72 | Sonova / XR |

MAC Address of unknown device ▲

Extrapolated model information = "Sonova"

FIG. 7

DETERMINING MODEL INFORMATION OF DEVICES BASED ON NETWORK DEVICE IDENTIFIERS

BACKGROUND OF THE INVENTION

1. Field of the Invention

This invention relates to the field of computer networks, and more particularly, to a system and method for determining the model information of devices based on their MAC addresses or other network device identifiers.

2. Description of the Related Art

A wide variety of client devices connect to enterprise networks to access or provide computing services. Examples of client devices that may join a network include desktop computers, laptops, tablet computers, smartphones, printers, routers, gaming devices, media players, televisions, home appliances, etc. The administrators of an enterprise network may need to set up security policies to ensure that devices joining the network do not pose a security risk. For example, the devices may need to be authorized, compliant with security policies, appropriately managed and patched, etc.

To manage risk, companies utilize a variety of compliance, vulnerability detection, and systems management products. It is often useful in this process to determine the specific models of devices that attempt to connect to the network. For example, the administrators may want to allow specific device models to join the network and/or prevent other device models from joining the network.

In addition to security reasons, it may be also be useful to know the specific models of the devices on a network for other reasons. For example, an administrator of an enterprise network may want to see a list of the specific device models or products present on the network in order to assess whether any of the devices need to be upgraded to newer models. As another example, a home user may want to see a list of all the devices connected to his home network, and it may be useful to provide the user with this information by listing the model name of each device.

Conventional techniques of learning the model of a device typically operate in two ways. First, a software agent can be installed on a device and can execute on the device to analyze it and determine its model information. Second, a remote computer on the network can scan a client device by sending various types of network messages to the device and analyzing the device's responses to the messages. Both of these approaches have drawbacks. In the first approach, the enterprise network may not have sufficient privileges to install an agent on a new device that attempts to join the network, or the device may not have the capability to execute the agent. For example, if a malicious user attempts to join the network, he may configure his device to reject attempts to install an agent that can learn about the device. Similarly, a device can also be configured to ignore scan traffic sent to it over the network, so that it will not return information that can be used to determine the model of the device. In short, existing approaches to gathering model information from an unknown device on a network typically involve some form of interaction, either through the execution of software agents or through network scans, and the dependence upon the unknown device to behave properly in these interactions introduces the potential for problems.

MAC addresses are used as network device identifiers for Ethernet networks and other network technologies. A MAC address is a unique identifier assigned to network interface device for communications on the physical network segment. MAC addresses are allocated in blocks to different device manufacturers. Thus, when a given manufacturer produces a new network interface device, the network interface device may be assigned one of the MAC addresses allocated to the manufacturer. For example, the MAC address may be stored in the network interface device's hardware, such as its read-only memory or some other firmware mechanism.

MAC addresses are formed according to the rules of one of three numbering name spaces managed by the Institute of Electrical and Electronics Engineers (IEEE): MAC-48, EUI-48, and EUI-64. The standard (IEEE 802) format for printing MAC-48 addresses in human-friendly form is six groups of two hexadecimal digits, separated by hyphens (-) or colons (:), in transmission order (e.g., 01-23-45-67-89-AB or 01:23:45:67:89:AB). The first three octets (in transmission order) identify the manufacturer that issued the MAC address and are known as the Organizationally Unique Identifier (OUI). Thus, in most cases, it is possible to determine the manufacturer of a network interface device from its MAC address.

However, just knowing the manufacturer of a network interface device is usually not enough information to determine the model information. Manufacturers often produce many different product families and device models. Furthermore, the network interface device which the MAC address identifies could be manufactured by one organization, and the network interface device could be included as a component in a computer or other product produced by another organization. Thus, knowing the manufacturer of a network interface device may not necessarily be enough information to know the manufacturer of the computer or other product that uses the network interface device. In situations such as described above, it is typically more important to know the model of the computer or other product that uses the network interface device than it is to know the manufacturer of the network interface device.

SUMMARY

Various embodiments are disclosed of a system and method for determining the model information of a device. According to some embodiments of the method, a request to determine the model information of the device may be received. The request may specify a network device identifier of the device. For example, in some embodiments the network device identifier may be a MAC address of the device. The method may operate to analyze a database to determine the model information of the device. The database may include database information that maps a plurality of network device identifiers of other devices to model information of the other devices. Determining the model information of the device may comprise extrapolating the model information of the device based on the network device identifier of the device and the database information. The extrapolated model information of the device may be returned in response to the request.

In some embodiments, extrapolating the model information of the device may include determining a set of network device identifiers within a threshold range of the network device identifier of the first device, and analyzing the database information to determine common model information to which at least a subset of the network device identifiers within the threshold range are mapped. The model information of the device may be extrapolated to be the common model information.

In further embodiments the method may further include determining a confidence level indicating a level of confidence that the extrapolated model information of the device is correct. The confidence level may be returned in response to the request along with the extrapolated model information.

In some embodiments, the analysis of the database information upon which the extrapolation of the model information for the device is based may be dynamically performed in response to the request to determine the model information. In other embodiments, a software program or module may analyze the database information offline, e.g., before the request is received, and may store pattern information or other analysis results that can later be used to extrapolate the model information.

Further embodiments of the method may include creating the database prior to receiving the request. Creating the database may include performing the following for each device of a plurality of devices: a) determining a network device identifier of the device; b) determining model information identifying a model of the device; and c) storing information in the database that maps the network device identifier of the device to the model information of the device. In some embodiments, determining the model information of a given device may include communicating over a network with a software agent executing on the given device to receive the model information from the software agent. In other embodiments, determining the model information of a given device may include passively intercepting model information transmitted by the given device over a network without communicating with the given device.

BRIEF DESCRIPTION OF THE DRAWINGS

FIGS. 6 and 7 illustrate a range of MAC addresses, and model information corresponding to some of the MAC addresses;

Figure 1:
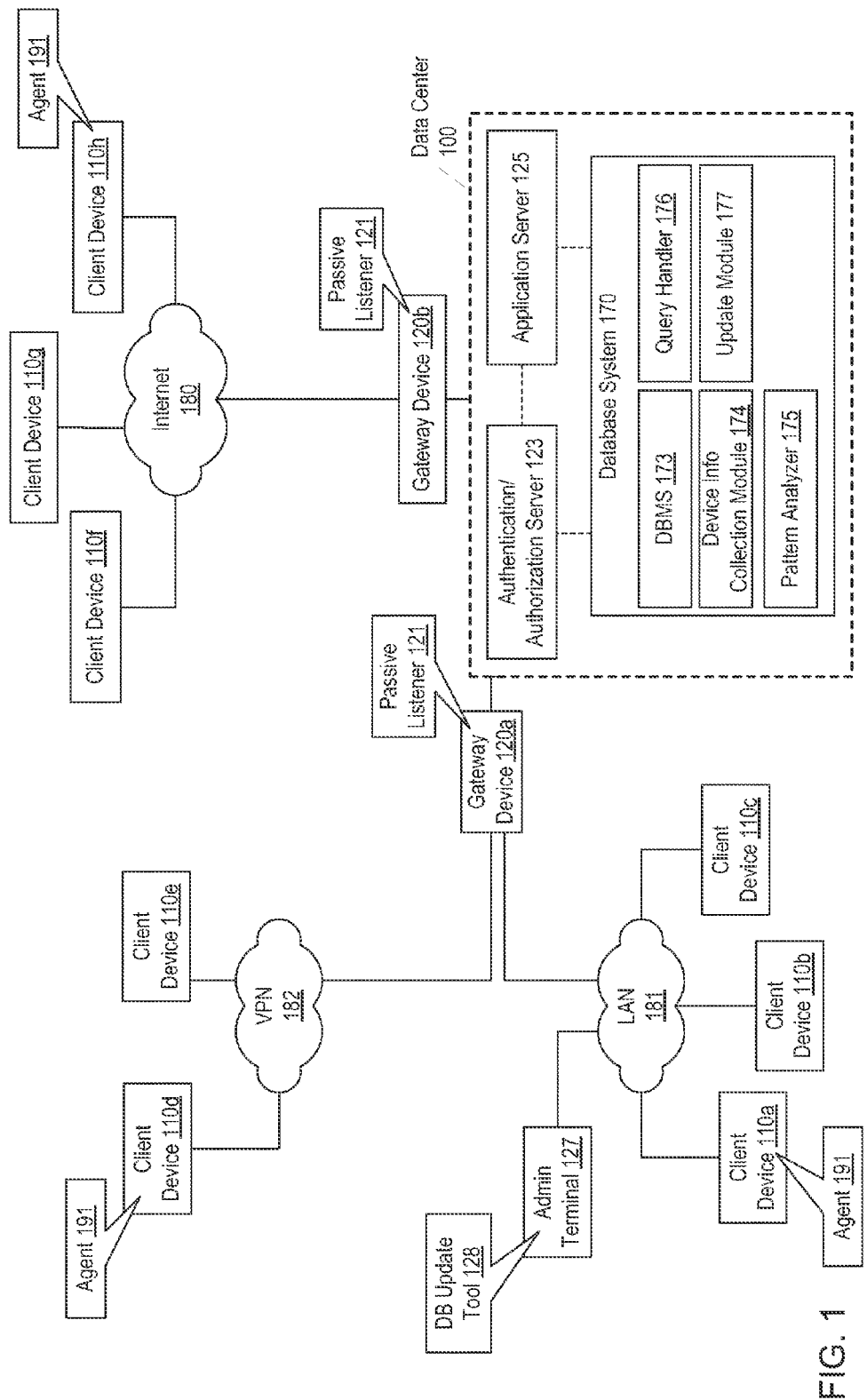
FIG. 1 illustrates one embodiment of a system configured to automatically create a mapping database that maps MAC addresses of a set of devices to model information of the devices.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments are disclosed of a system and method for automatically determining the model information of devices based on their network device identifiers. The devices may be any devices configured to connect to, receive data over, and/or transmit data over a network, e.g., via wired and/or wireless communication protocols. Examples of devices whose model information may be determined based on their network device identifiers include desktop computers, laptops, tablet computers, smartphones, printers, routers, gaming devices, etc.

The term "network device identifier" refers to an identifier that is assigned to a specific device and identifies the device. For example, the network device identifier of a device may be assigned to the device when the device is manufactured and may not be re-assigned to any other device. In some embodiments a device's network device identifier may be included in network packets transmitted by the device over a network, e.g. to identify which device the packets originated from. A network device identifier may include numerical information, text information, and/or other information. One example of a network device identifier is a MAC address. While, strictly speaking, a MAC address or other network device identifier may be assigned to a network interface device that is included in a larger device (e.g., in a computer or other network device), the network interface device is most commonly a fixed component of the larger device, and thus also uniquely identifies the larger device.

For the remainder of this disclosure, embodiments are described in which the network device identifiers of the devices are assumed to be MAC addresses. However, in other embodiments any kind of network device identifiers other than MAC addresses could be used.

The term "model information" may refer to any information that specifies at least a family name and/or model name of a device. The model name of a device may be a name used by a vendor of the device and/or a name used by media or consumers to describe or identify the specific model of the device, e.g., a specific product sold under that model name. The family name of a device may be a name used to describe or identify a family of related device models. As an example, consider an iPhone 3GS product from Apple Inc. In this example, the model name may be "iPhone 3GS". As another example, consider an iPhone 5 product from Apple Inc. In this example, the model name may be "iPhone 5". In both cases the family name may be "iPhone".

In some embodiments the model information may also include other information which may be more granular or less granular than the family name and model name. For example, more granular information may include more detailed information about the device, such as the specific hardware configuration and/or software configuration of the device (e.g., "iPhone 3GS/16 GB" to indicate that a particular device is configured with 16 GB of flash memory). As another example, less granular information may include broader information about the device, such as its vendor for example (e.g., "Apple iPhone 3GS" to indicate that the device is produced by Apple Inc.)

Embodiments of the system and method may operate to automatically determine the model information of unknown devices based on the MAC addresses (or other network device identifiers) of the unknown devices. To accomplish this, the system may be configured with a database (referred to herein as the "mapping database") including information that maps a plurality of network device identifiers of known devices to known model information of the known devices. The model information of an unknown device may be extrapolated based on the MAC address of the unknown device and the mapping database information.

Further embodiments of the system and method may operate to automatically create the mapping database that is used to extrapolate the model information of the unknown devices. This may generally be accomplished by gathering information indicating the MAC addresses of a plurality of devices and model information known about the devices, and creating a database entry for each device that maps its MAC address to its model information.

FIG. 1 illustrates one embodiment of a system configured to automatically create the mapping database. The system includes a data center 100 that has one or more computer systems configured to automatically gather information indicating the MAC addresses and model information of a plurality of client devices coupled to one or more networks.

In this example, client devices 110a-h are coupled to the data center through networks, such as the Internet 180, local area network (LAN) 181, and virtual private network (VPN) 182. In general, the client devices may be coupled to the data center through any type of network or combination of networks. For example, the network(s) may include any type or combination of LAN, wide area network (WAN), an Intranet, the Internet, VPN, wireless networks, etc. Examples of LANs include Ethernet networks, Fiber Distributed Data Interface (FDDI) networks, and token ring networks. The client devices may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

The data center may gather information about various client devices for the mapping database using active and/or passive information gathering techniques. As an example of an active technique, some of the client devices may have a software information agent 191 installed. Each client device that has the information agent installed may execute the information agent, which may analyze the client device to automatically determine the model information of the client device. For example, the agent may analyze information maintained by an operating system of the client device to discover the model information, e.g., by examining one or more registries, databases, or files of the operating system, and/or programmatically querying the operating system through an application programming interface (API). The agent may also discover the model information by analyzing or querying firmware of the client device.

The data center may include one or more computer systems configured to communicate over the network(s) with the information agents executing on the client devices to receive the model information of the client devices from their respective information agents. For example, in the illustrated embodiment of FIG. 1, the data center includes a database system 170 that includes a device collection module 174 that may communicate with the agents 191 to receive the model information of the respective client devices. In addition to the model information, each agent may also provide the device collection module with the MAC address of the client device, or the device collection module could determine the MAC address by examining the network packets sent by the agent from the client device.

In some embodiments, the organization that operates the data center may already have software agents installed on a large base of client devices, e.g., for a purpose other than gathering information to create the mapping database. These existing agents could be used to gather the model information and provide it to the device collection module without requiring new software agents to be installed on the client devices. For example, a vendor of anti-virus or security software may already have anti-virus or security agents installed on a large base of client devices. The anti-virus agents may communicate with the vendor's data center to receive anti-virus updates and/or provide the data center with information about the client devices. Thus, the model information could also be communicated to the data center and used to create the mapping database. As another example, a large organization could have a large number of client devices, each of which may execute a management agent to aid administrators in managing the organization's network. The management agents may communicate with a data center of the organization and/or communicate with a data center of the vendor of the management software, and may include the model information of the client devices in their communication, which could then be used by the data center to create the mapping database.

Leveraging existing agents to gather the model information may advantageously avoid the need to install a new agent on the client devices for this purpose. Furthermore, if the agents are already installed on large base of client computers (e.g., for a popular anti-virus product or network management product) then this may enable a large mapping database with many data points to be created, which may advantageously enable more accurate extrapolation or estimation of the model information for unknown client devices that do not have the agent installed.

In addition to gathering the model information through active information agents on the client devices, the data center may also gather model information for some client device through passive listening techniques, e.g., without directly communicating with the client devices. For example, in the illustrated embodiment of FIG. 1, the system includes gateway devices 120a-b through which network traffic sent to the data center is transmitted. Each gateway device may include a passive listener 121, which may be implemented in software or hardware. The passive listener may "listen" to or examine the network packets transmitted by the client devices to the data center, and may determine the model information of the client devices based on the information in the network packets.

For example, in some embodiments, a client device may broadcast information about itself to other devices on the network, e.g., when it joins the network or in response to queries from other devices. The broadcast information may specify the model of the client device and/or may include information that can be used to infer the model of the client device.

As one example, a client device could broadcast information to announce that it wants to join local sharing with other devices, and the broadcast information could specify the client device's model name or local name. For example, in some embodiments the broadcast information could include a formal field for the model name, such as "model=MacBookPro8,1". In other embodiments the broadcast information could include an informal name that a user has named the device and from which the model information can be inferred, such as "Joe's Dell Latitude E6430".

As another example, if a client device is looking for a printer then it may broadcast a service discovery message, and available printers on the network may respond with information specifying their model names/numbers. Thus, the passive listener may obtain model information about the client devices that broadcast the message and/or the printer devices that responded.

As one example, a client device could perform a Dynamic Host Configuration Protocol (DHCP) broadcast to obtain an IP address, and may include identifying information about itself in an options string. Thus, the passive listener may receive the DHCP options string and analyze it to determine the model information of the client device and/or determine information that can be used in conjunction with other information about the client device to determine the model information.

Other examples of broadcast protocols performed by client devices from which the passive listener may gather model information include NetBIOS name service, Simple Service Discovery Protocol (SSDP), Zero configuration networking (e.g., Bonjour), or any of various other kinds of protocols that devices use to announce information about themselves to other devices on a network and/or obtain information about the other devices.

In addition to listening for broadcast information, in some embodiments the passive listener may also determine information about client devices from network packets sent by the client devices to a specific endpoint in the data center. For example, HTTP packets sent to a web server in the data center may include information about the web browser version used on the client devices. In some cases the web browser information could identify, or could help identify, the specific model of the client device. For example, the browsers used in gaming consoles or other embedded devices may transmit header information that identifies the specific model or family of the embedded device.

Thus, a passive listener may compile as much specific information as possible about the client devices that may be useful to identify the model information of the client devices, and may transmit the information to the data center, e.g., to the device collection module. It is noted that the passive listener(s) may reside anywhere in the system, e.g., on any device other than a gateway device. For example, in some embodiments a passive listener may reside on a web server computer or other server computer system in the data center.

The device collection module may store information in the mapping database that maps the MAC addresses of the client devices to the model information gathered from the information agents and passive listeners, e.g., by creating a respective database entry for each respective client device whose model information was discovered. The database entry for each client device may map the MAC address of the client device to the model information of the client device.

In various embodiments the mapping database may be any kind of database, e.g., may be structured or created according to any of various kinds of database technologies or data management techniques. In some embodiments at least a portion of the mapping database may be a relational database including one or more tables organized as a plurality of rows and columns. For example, the database entry for each client device may be created by inserting a new row in a table, where one column of the row specifies the MAC address of the client device and another column specifies the model information of the client device.

As illustrated in FIG. 1, in some embodiments the database system 170 may include a database management system (DBMS) 173 or database engine operable to create and manage the mapping database. The DBMS may provide an API that the device information collection module 174 or other programs can programmatically call to insert new information in the mapping database, retrieve information from the mapping database, change information in the mapping database, etc. In some embodiments the API of the DBMS may use a variant of Structured Query Language (SQL), e.g., if the mapping database is a relational database.

Thus, the data center may automatically determine the model information and MAC addresses of a plurality of known client devices, e.g., without receiving user input specifying the model information and MAC addresses, and may automatically create a mapping database that maps each of the MAC addresses to the corresponding model information. The mapping database may then be used to automatically determine the model information of other client devices.

Figure 2:
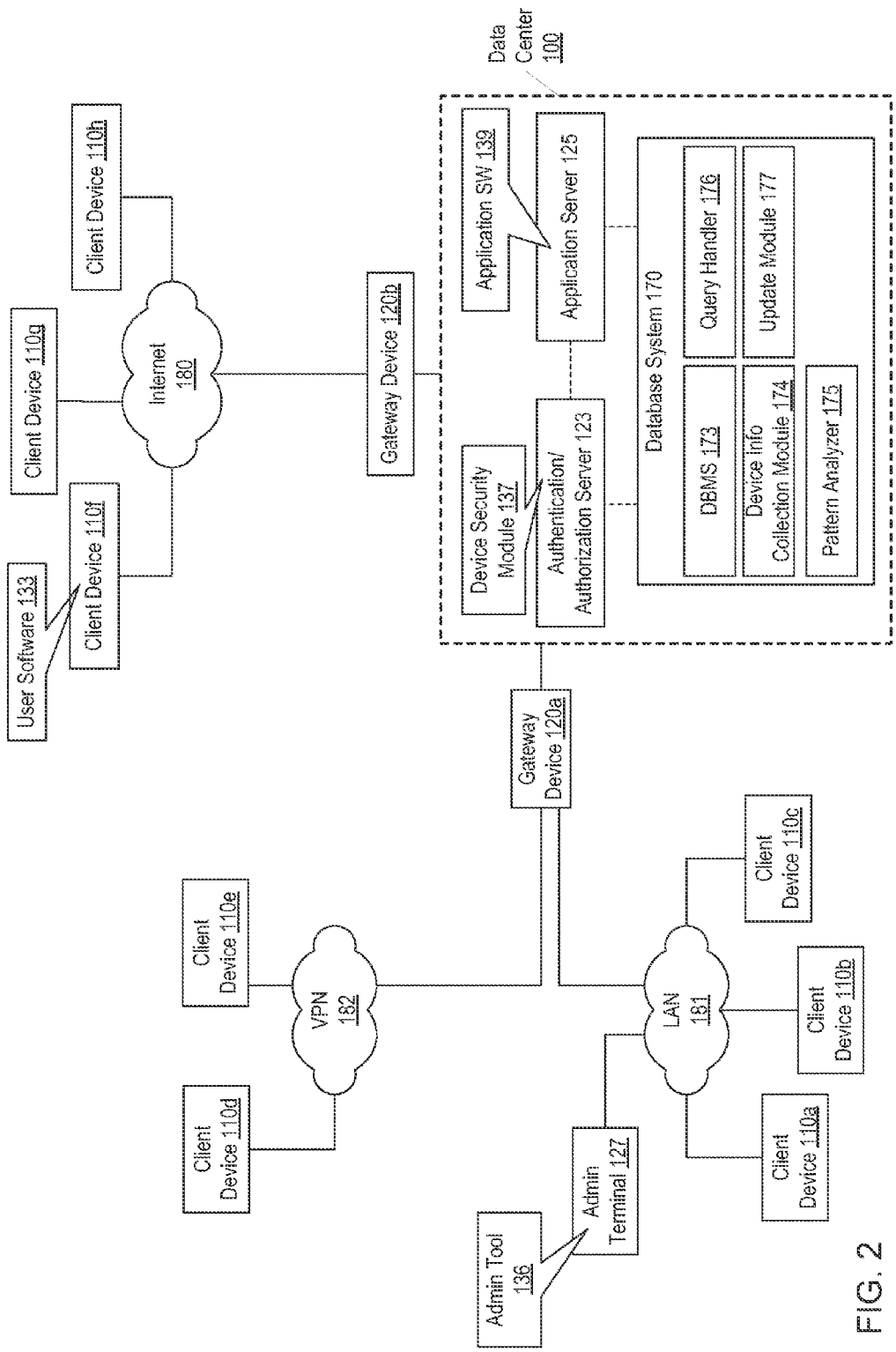
FIG. 2 illustrates an embodiment of the system in which the mapping database is used to automatically determine the model information of one or more client devices whose model information is not yet known.

FIG. 2 illustrates an embodiment of the system in which the mapping database is used to automatically determine the model information of one or more client devices whose model information is not yet known, e.g., one or more client devices whose model information was not determined from the agents or passive listeners and is not yet in the mapping database.

The database system 170 may include a query handler 176 that is executable to receive a request to determine model information for a given device based on a MAC address or other network device identifier of the device. For example, a requester software program such as the device security module 137, application software 139, administration tool 136, user software program 133, or other software program or module may call a function or API provided by the query handler in order to request the model information of the device. The requester may pass the MAC address of the device to the query handler as an input parameter. The query handler may attempt to lookup the MAC address in the mapping database. If a database entry for the specified MAC address is found then the query handler may return the corresponding model information specified by the database entry to the requester program. Otherwise, if the specified MAC address is not mapped to any model information in the mapping database then the query handler may attempt to extrapolate the model information of the device based on the specified MAC address of the device and the database entries for the other devices. The query handler may then return the extrapolated model information to the requester program. The extrapolation of the model information is discussed in detail below with respect to FIGS. 5-7.

Figure 3:
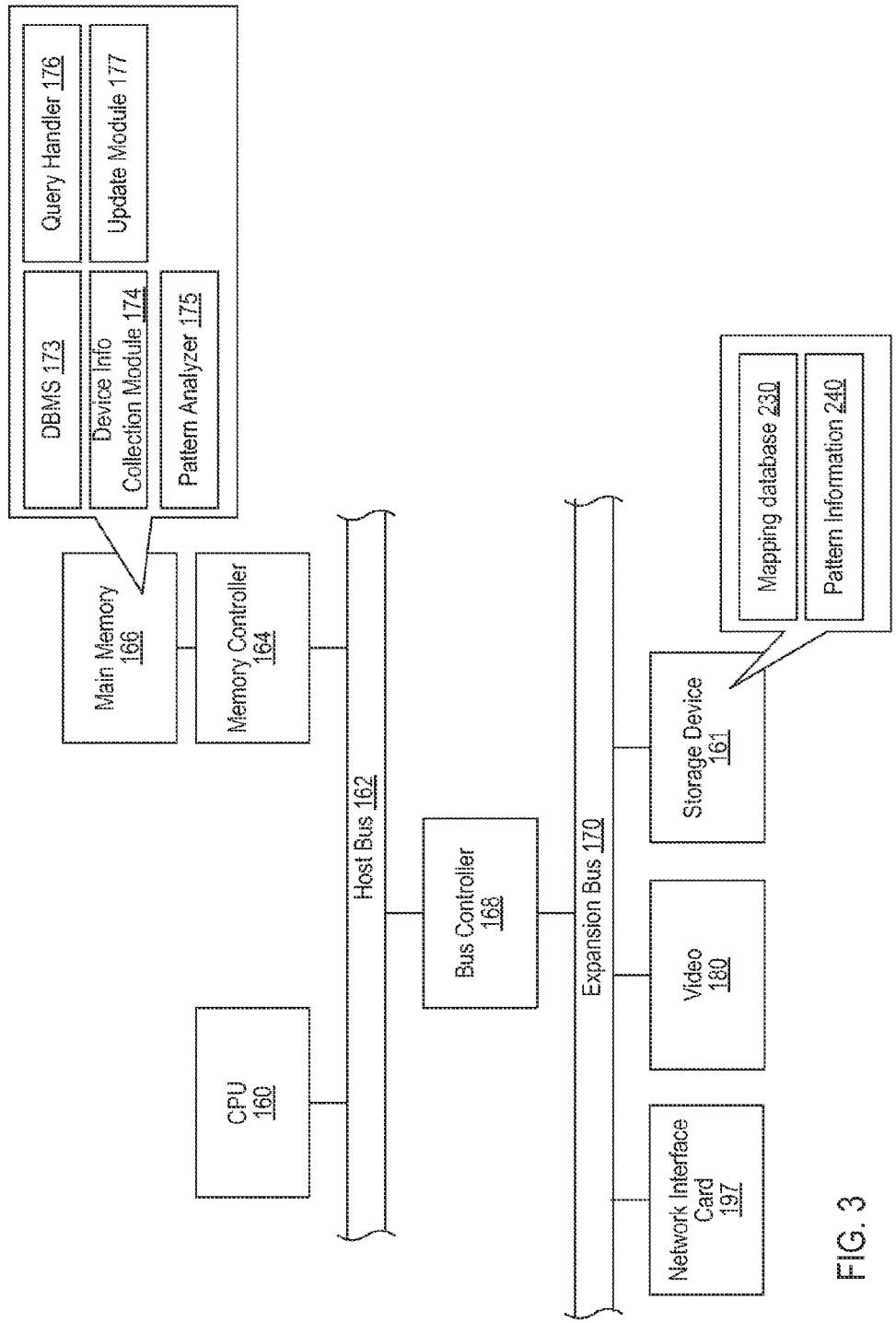
FIG. 3 illustrates one embodiment of a computer for creating and/or using the mapping database.

Turning now to FIG. 3, a block diagram is illustrated of one embodiment of a computer for creating and/or using the mapping database. Although FIG. 3 is intended to illustrate a single computer, it is noted that the methods described herein can be distributed across any number of computers, e.g., where multiple computers perform different aspects of the methods and communicate with each other via a network. For example, in some embodiments the DMBS 173 may execute on one computer, and the device information collection module 174 may execute on another computer. In general, the methods described herein may be implemented by any system encompassing any device or combination of devices having at least one processor that executes instructions from one or more storage media.

The software programs or modules that implement the methods may be executed on any kind of computer or computing device(s), such as one or more personal computer systems (PC), workstations, servers, network appliances, or other type of computing device or combinations of devices. The computer(s) may have any configuration or architecture, and FIG. 3 illustrates a representative PC embodiment. Elements of a computer not necessary to understand the present description have been omitted for simplicity.

As illustrated in FIG. 3, the computer may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the computer may include multiple processors 160.

The computer may include memory 166 in which program instructions implementing one or more software programs or modules are stored. The program instructions may be executed by the processor(s) 160. In the illustrated embodiment, the memory 166 stores a database management system (DBMS) 173, query handler 176, device information collection module 174, pattern analyzer 175, and update module 177. In other embodiments, any of various other software architectures may be used, e.g., such that the functionality for creating and/or using the mapping database can be divided across different software programs or modules in any of various other ways. In general, the memory 166 may store any set of program instructions executable to implement any of the operations described herein that are associated with creating and/or using the mapping database.

In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the computer. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, a network interface card 197, and one or more storage devices 161.

As illustrated in FIG. 3, a mapping database 230 may be stored on the storage device(s) 161. In addition, pattern information 240 indicating one or more patterns of the mappings in the mapping database may be stored on the storage device(s) 161, e.g., patterns between the device MAC addresses and the device model information. The pattern information may be created by the pattern analyzer module 175, which may analyze the mapping database as described in more detail below.

The storage device(s) 161 may include any kind of device configured to store data, such as one or more disk drives, solid state drives, flash memory devices, optical drives, or tape drives for example. In the illustrated example, the one or more storage devices are coupled to the computer via the expansion bus 170, but in other embodiments may be coupled in other ways, such as via the network interface card 197, through a storage area network (SAN), via a communication port, etc.

Figure 4:
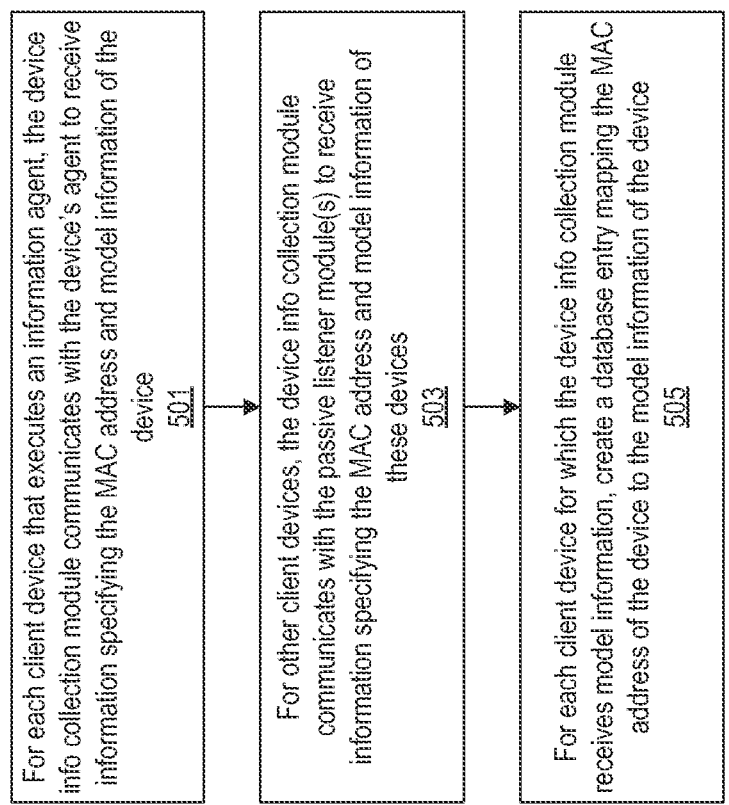
FIG. 4 is a flowchart diagram illustrating one embodiment of a method for creating the mapping database.

FIG. 4 is a flowchart diagram illustrating one embodiment of a method for creating the mapping database. It is noted that the flowcharts illustrated in the drawings illustrate logical operations that may be performed according to some embodiments, and in other embodiments the illustrated operations may be combined, omitted, modified, or performed in different orders than shown.

As discussed above, in some embodiments a device information collection module may receive information regarding some of the client devices from software information agents executing on the client devices. For each client device that executes an information agent, the device info collection module may communicate with the client device's agent to receive information specifying the MAC address and model information of the client device (block 501).

In some embodiments the device information collection module may also receive information regarding some of the client devices from one or more passive listener modules. For each of these client devices, the device information collection module may communicate with the passive listener (s) to receive information specifying the MAC address and model information of these client devices (block 503).

For each client device for which the device information collection module receives model information (e.g., from an agent on the client device and/or from a passive listener), a database entry may be created in the mapping database to map the MAC address of the client device to the model information of the client device. The database entries may be created by the device information collection module or by another program or module to which the device information collection module passes the MAC addresses and model information it discovers.

In various embodiments the model information for each entry in the mapping database may be formatted or stored in any desired way. In some embodiments the model information may include text information, e.g., one or more strings. In other embodiments the model information may include a numerical identifier, and the mapping database may include a table that maps different identifiers to the corresponding model names.

In some embodiments the model information may be stored according to a hierarchical organization technique. For example, the model information could include text specifying the company that makes or sells the device, followed by text specifying the family name, followed by text specifying the particular model of the device. These different parts of the model information could be separated by slash ("/") characters or other delimiters. For example, suppose that some company named "CompanyX" offers tablet computers with the model names "Sonova GP", "Sonova XL", and "Sonova XR". In this example, the family names of these three models of tablet computers is "Sonova". One way of storing the model information for the "Sonova GP" model could be to store the string "Company X/Sonova/GP". On the other hand, if the system determines that the device is a tablet computer in the Sonova family but cannot determine the exact model then the stored model information could be "Company X/Sonova". The system may also store more detailed information about the device if it is available. For example if a particular Sonova GP tablet computer is determined to have 64 GB of internal memory then the stored model information could be "Company X/Sonova/GP/64 GB".

The examples above are given to illustrate one embodiment of how the model information may be hierarchically organized in the mapping database. In other embodiments, the model information may be stored according to any other kind of hierarchical organization scheme. Also, the model information for devices offered by different companies or belonging to different product families may be formatted differently, e.g., according to what makes the most sense for a given product line.

Figure 5:
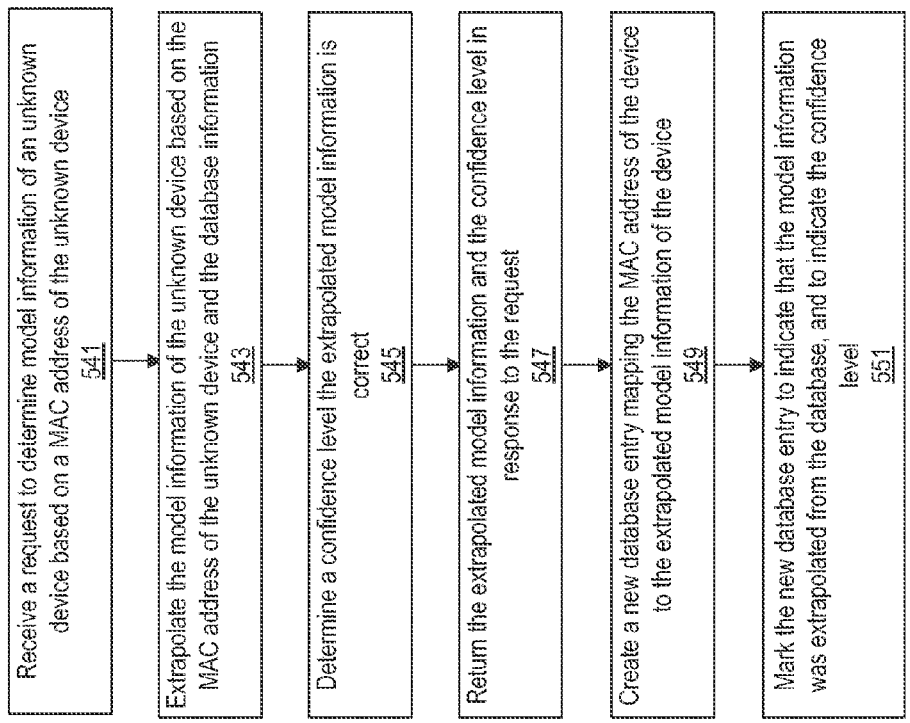
FIG. 5 is a flowchart diagram illustrating one embodiment of a method for using the mapping database to automatically determine the model information of an unknown client device based on its MAC address.

FIG. 5 is a flowchart diagram illustrating one embodiment of a method for using the mapping database to automatically determine the model information of an unknown client device based on its MAC address. The method may be implemented by the query handler 176 of the database system or by another software module of the data center. The query handler may receive a request to determine the model information of the unknown device based on its MAC address (block 541), e.g., where the MAC address is specified as an input parameter in a function or API invoked by a requester program. After determining that the specified MAC address is not already mapped to any model information in the mapping database, the query handler may extrapolate the model information of the unknown device (block 543).

In various embodiments the query handler may use any kind of algorithm, heuristic, or data analysis technique to extrapolate the model information of the unknown device based on the MAC address of the unknown device and the mapping information already in the mapping database. In some embodiments, extrapolating the model information of the unknown device may include determining a set of MAC addresses within a threshold range of the MAC address of the unknown device, and analyzing the mapping database to determine common model information to which at least a subset of the MAC addresses within the threshold range are mapped. The model information of the unknown device may be extrapolated to be the common model information.

For example, FIG. 6 illustrates a case where the MAC address of the unknown device is 00-22-9B-B7-ED-68. The query handler may examine the mapping database to determine whether any of the neighboring MAC addresses within a threshold number of addresses away from this MAC address are mapped to corresponding model information in the database. In the example of FIG. 6, the query handler may begin by analyzing the mapping database information to determine whether any of the 10 closest MAC addresses on either side of the specified MAC address have entries in the database. For example, suppose that the database has mapping entries for 5 of the MAC addresses in this range, and they are all mapped to the model information string "Sonova/XL" as shown in FIG. 6. The query handler may retrieve the model information for the 5 MAC addresses within this range that have entries in the database, and may analyze it to attempt to determine a pattern between the MAC addresses and their corresponding model information. In this case the query handler may determine that the 5 MAC addresses within the range that are present in the database are all mapped to the common model information "Sonova/XL". Thus, the model information for the unknown device may be extrapolated to be "Sonova/XL" in this example.

FIG. 7 illustrates another example where the database has mapping entries for 6 of the MAC addresses within 10 positions on either side of the specified MAC address. In this example, the model information is not exactly the same for all 6 of these MAC addresses. However, the query handler may still be able to determine common model information for all of them, namely that they all correspond to the "Sonova" family of devices. Thus, the model information for the unknown device may be extrapolated to be "Sonova" in this example.

For ease of illustration, the 10 closest MAC addresses on either side of the specified MAC address are shown in FIGS. 6 and 7. In a more typical case the query handler may analyze a wider range of MAC addresses to extrapolate the model information of the unknown device. In general, the extrapolation may be performed based on any number of mapping entries in the database.

Also, the query handler may perform multiple rounds of analyses, e.g., where a different range of MAC addresses is analyzed in each round. For example, the query handler may begin by analyzing a relatively small range of neighboring MAC addresses. If mapping entries for a sufficient number of addresses within this range are present then the query handler may extrapolate and return the model information for the unknown device based on this range. Otherwise the query handler may widen the range and then analyze the wider range to check whether mapping entries are present for a sufficient number of addresses within the wider range. If so then the query handler may extrapolate and return the model information for the unknown device based on the wider range. Otherwise, the range may be widened again, and the analysis process may continue in this manner.

In some embodiments the query handler may extrapolate or estimate the model information for the unknown device based on mapping entries for other MAC addresses that share the first three to five octets. If more than some threshold percentage of the MAC addresses in the same immediate neighborhood (e.g., sharing the first five octets) have been observed and share consistent model information then the model information for the unknown device may be identified as most likely being that same model. Failing that, if more than some threshold percentage of the MAC addresses in a broader neighborhood (e.g., sharing the first four octets) have been observed and share consistent model information, then the model information for the unknown device may be identified from the broader neighborhood. Failing that, if more than some threshold percentage of the MAC addresses with the same Organizationally Unique Identifier (OUI) (e.g., sharing the same initial three octets) have been observed and share consistent model information, then the model information for the unknown device may be identified from this neighborhood.

In various embodiments the query handler may be configured according to any of various algorithms or tuning parameters in order to determine which ranges of MAC addresses to analyze, what threshold percentage of the MAC addresses within the range should have mapping entries in the database, how to widen the ranges if this threshold percentage is not met, how to analyze the mapping information for the addresses within the range to determine whether they share common model information, etc.

Referring again to FIG. 5, in addition to extrapolating or estimating the model information for the unknown device, the query handler may also determine a confidence level indicating a level of confidence that the extrapolated model information is correct (block 545). For example, if the model information is extrapolated from a relatively narrow range of MAC addresses for which a large percentage of mapping entries are present in the database then the confidence level may be higher than if the model information is extrapolated from a relatively wide range of MAC addresses for which a small percentage of mapping entries are present. The query handler may define the confidence level according to any of various scales or rating techniques, such as a scale from 1 to 5, or a percentage from 0 to 100, etc.

In some cases the query handler may not be able to extrapolate the model information at all, or may indicate a very low confidence level that the extrapolated model information is correct, e.g., if an insufficient number of mapping entries for a large range of neighboring MAC addresses are present and/or if there is no discernible pattern or commonality in the model information for the neighboring MAC addresses.

Once the query handler has extrapolated the model information of the unknown device and determined the confidence level, this information may be returned to the requester program (block 547).

In some embodiments the query handler may also create a new entry in the mapping database that maps the specified MAC address of the device to the extrapolated model information of the device (block 549). Thus, if a future request to lookup the model information for the same device is received, the query handler may return the model information stored in the database entry for this MAC address without re-analyzing the database. In addition, the query handler may also mark the new database entry to indicate that the model information was extrapolated from the database, and to indicate the confidence level (block 551). In some embodiments, in future analyses of the database to extrapolate the model information for other unknown devices, the query handler may give less weight in the analysis to model information that was previously extrapolated. In other words, the analysis may give more weight to the model information determined by the information agents or passive listeners than to previously extrapolated model information.

Also, in some embodiments, if an entry for a given MAC address was previously extrapolated and marked with low confidence, another analysis for this MAC address may later be performed when more entries for more client devices have been created from newly discovered information. Thus, the model information may be changed as more data points are added to the mapping database, or the mapping information may stay the same, but the confidence level may be increased.

In some embodiments, the analysis of the mapping database upon which the extrapolation of the model information for an unknown device is based may be dynamically performed in response to the request by the requester program to determine the model information for the unknown device. For example, the query handler may receive the request and then analyze the mapping database in real time in response to the request.

Figure 8:
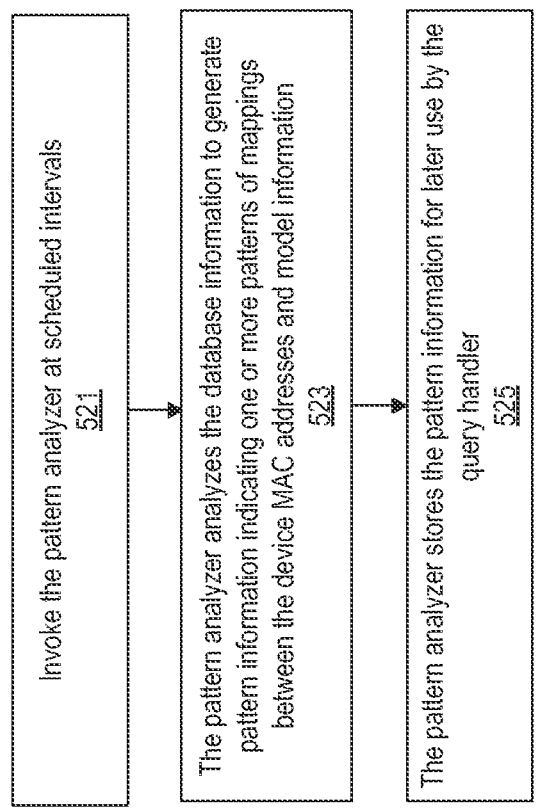
FIG. 8 is a flowchart diagram illustrating one embodiment of a method for using a pattern analyzer to perform offline analysis of the mapping database offline and store analysis results that can later be used to extrapolate model information.

In other embodiments, a software program or module such as the pattern analyzer 175 illustrated in FIGS. 1-3 may analyze the mapping database offline and store analysis results that can later be used by the query handler to extrapolate model information. In some embodiments this may decrease the time it takes the query handler to extrapolate the model information since the database analysis (or at least a portion of the analysis) could be performed prior to actually receiving a request from a requester program. As illustrated in FIG. 8, the pattern analyzer may be invoked at scheduled intervals (e.g., once per hour, or once per day, or once per week, etc.) or at unscheduled intervals (block 521). Each time it is invoked, the pattern analyzer may execute to analyze the mapping database information to generate pattern information indicating one or more patterns of mappings between the device MAC addresses and the corresponding model information (block 523). The pattern information may include any information useful in extrapolating the model information for a given MAC address. For example, in some embodiments the pattern information may indicate the common model information for one or more ranges of MAC addresses. The pattern analyzer may store the pattern information for later use by the query handler, e.g., may store the pattern information in the mapping database or in one or more separate files (block 525).

Figure 9:
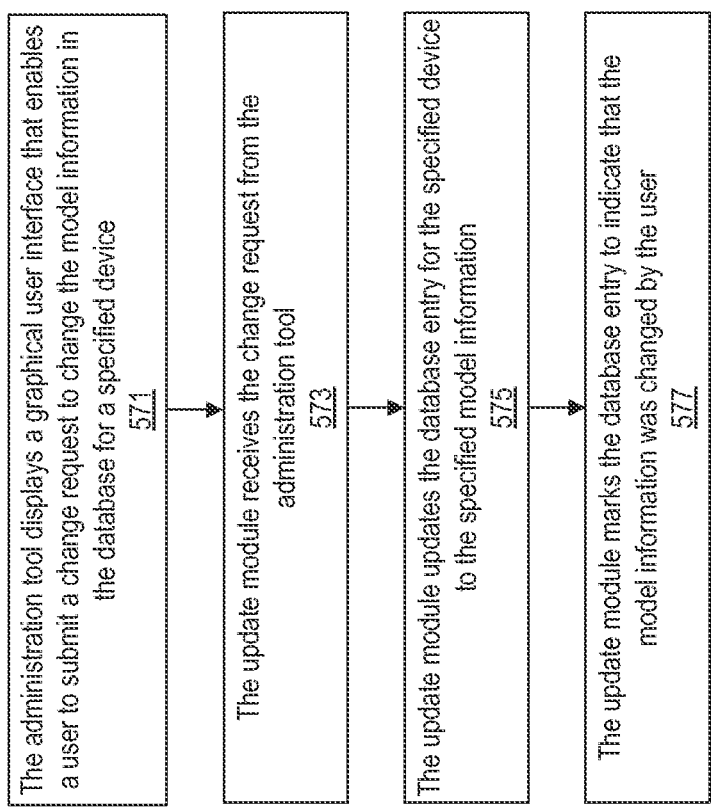
FIG. 9 is a flowchart diagram illustrating one embodiment of a method for using an administration tool to change the model information stored in the mapping database for a client device.

In some embodiments the database system may enable a user to change the model information for one or more MAC addresses in the mapping database. For example, if an administrator of an enterprise network determines that the model information that was automatically determined or extrapolated for a given client device on the network is incorrect, he may invoke an administration tool 136 on an administration terminal 127, as shown in FIG. 2. FIG. 9 is a flowchart diagram illustrating one embodiment of a method for using the administration tool to change the model information stored in the mapping database for a client device. The administration tool may display a graphical user interface that enables the administrator to submit a change request to change the model information in the mapping database for a specified client device (block 571). An update module 177 in the database system may communicate with the administration tool to receive the change request (block 573). In response, the update module may update the database entry for the specified client device to the specified model information (block 575). In some embodiments the update module may mark the database entry for the client device to indicate that the model information was changed by the administrator (block 577).

In some embodiments the system may also allow an end user other than an administrator to change the model information for the end user's client device(s). For example, an end user of the client device 110f in FIG. 2 may invoke user software 133 that enables the end user to change the model information. End users and other non-administrators may be prevented from changing the model information for other client devices not owned by the end user. The system may also mark the database entries to indicate that they were changed by an administrator or end user and adjust the confidence levels of the entries accordingly.

Figure 10:
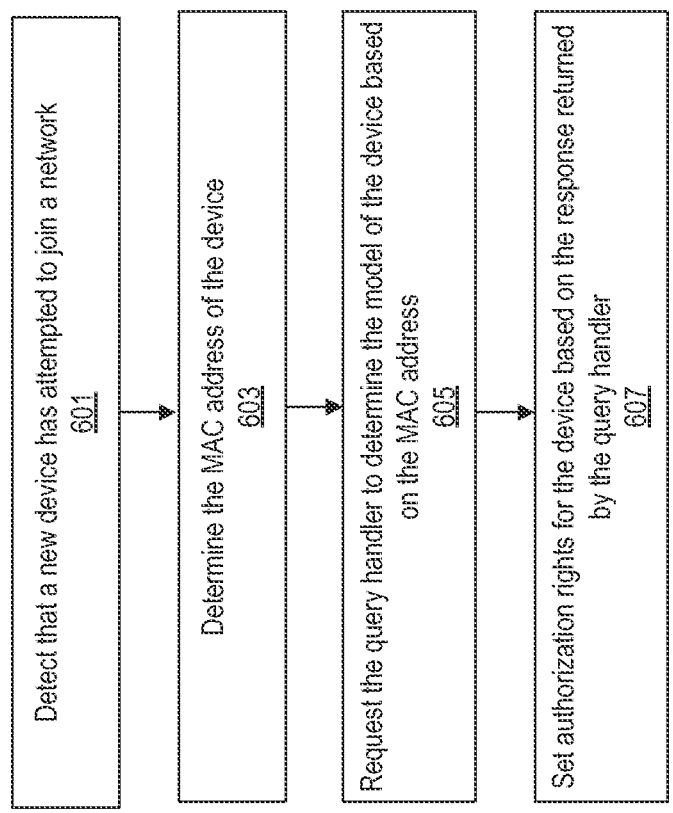
FIG. 10 is a flowchart diagram illustrating one embodiment of a method for using the mapping database to look up the model information for a new device in response to the new device attempting to join a network, e.g., in order to determine the authorization rights to assign the new device.

Thus, the data center may provide a service that enables various types of requester programs to determine the model information for various client devices based on their MAC addresses. In various embodiments the requester programs may be any of various types of programs or software services and may attempt to lookup the model information for a given device for any of various purposes. For example, FIG. 10 is a flowchart diagram illustrating one embodiment of a method for using the mapping database to look up the model information for a new device in response to the new device attempting to join a network, e.g., in order to determine the authorization or security rights to assign the new device. For example, a device security module 137 executing on a computer system in the data center such as an authentication/authorization server 123 (see FIG. 2) may detect that the new device has attempted to connect to a network with which the data center is associated (block 601 of FIG. 10). In response, the device security module may determine the MAC address of the new device (block 6013) and request the query handler to determine the model of the new device based on the MAC address (block 605). As described above, the query handler may respond to the request by returning the model information of the new device (which may already be stored in the mapping database or may be extrapolated from other mapping information already stored in the mapping database). The device security module may then set the authorization rights for the new device based on the response returned by the query handler (block 607), e.g., depending on the model information determined for the new device.

As another example, the administration tool 136 (see FIG. 2) may be operable to display a list of client devices on the network in order to enable an administrator of the network to see a list of the specific device models or products present on the network. The administration tool may determine the MAC addresses of the client devices on the network and request the query handler to return the model information of the client devices based on their MAC addresses. As another example, user software 133 (see FIG. 2) may enable a user of a client device 110f to see a list of all the devices connected to the user's home network and their model information. The user software 133 may communicate with the query handler to determine the model information for the devices. In other embodiments any of various other kinds of requester programs may use the query handler's services.

Figure 11:
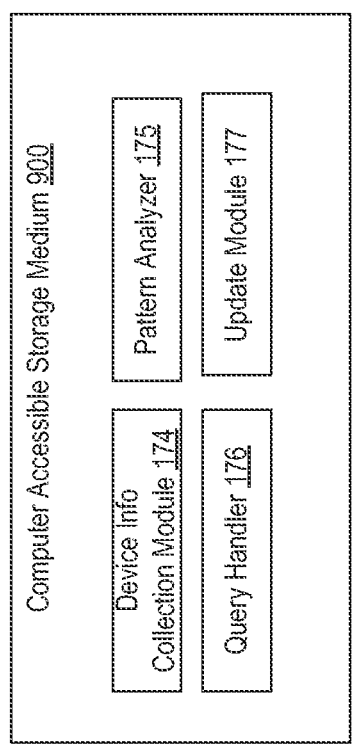
FIG. 11 illustrates a computer accessible storage medium that stores program instructions executable by one or more processors to implement operations associated with creating and/or using the mapping database.

Turning now to FIG. 11, a block diagram of a computer accessible storage medium 900 is shown. The computer accessible storage medium 900 may store program instructions executable by one or more processors to implement various functions described above, such as functions performed by the device information collection module 174, query handler 176, pattern analyzer 175, and/or update module 177. Generally, the computer accessible storage medium 900 may store any set of instructions which, when executed, implement a portion or all of the functions described above with respect to creating and/or using the mapping database.

Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method comprising:
   receiving a request to determine model information of an unknown first device of a plurality of devices connected to a network, each of the plurality of devices having a corresponding network device identifier;
   in response to receiving the request:
      analyzing a database to determine the model information of the unknown first device, wherein the database includes database information that maps one or more of the plurality of network device identifiers to model information of one or more corresponding devices of the plurality of devices;
      in response to determining a device identifier for the unknown first device is not already mapped to model information in the database, determining model information for the unknown first device without communicating with the unknown first device by:
         extrapolating model information of the unknown first device based on portions of a device identifier associated with the request and the database information; and
         determining a confidence level indicating a level of confidence that the extrapolated model information of the first device is correct;
      returning the extrapolated model information of the first device and the confidence level in response to the request.

2. The method of claim 1, wherein said extrapolating the model information of the first device comprises:
   determining a set of network device identifiers within a threshold range of the network device identifier of the first device; and
   analyzing the database information to determine common model information to which at least a subset of the network device identifiers within the threshold range are mapped, wherein the model information of the first device is extrapolated to be the common model information.

3. The method of claim 1, further comprising:
   prior to said receiving the request, analyzing the database information to generate pattern information indicating one or more patterns of mappings between the network device identifiers of the other devices and the model information of the other devices; and
   storing the pattern information;
   wherein said analyzing the database to determine the model information of the first device comprises extrapolating the model information of the first device based on the network device identifier of the first device and the pattern information.

4. The method of claim 1, wherein said extrapolating the model information of the first device comprises dynamically analyzing the database information in response to the request to identify one or more patterns of mappings between network device identifiers of devices other than the first device and the model information of the other devices.

5. The method of claim 1, further comprising creating the database prior to said receiving the request, wherein creating the database comprises:
   for each device of a plurality of devices:
      a) determining a network device identifier of the device;
      b) determining model information identifying a model of the device; and
      c) storing information in the database that maps the network device identifier of the device to the model information of the device.

6. The method of claim 5, wherein determining the model information identifying the model of a given device comprises automatically determining the model information without receiving user input specifying the model information.

7. The method of claim 5, wherein determining the model information identifying the model of a given device comprises communicating over the network with a software agent executing on the given device to receive the model information from the software agent.

8. The method of claim 5, wherein determining the model information identifying the model of a given device comprises passively intercepting model information transmitted by the given device over a network without communicating with the given device.

9. The method of claim 1, further comprising:
   detecting that the first device is coupled to the network;
   determining the network device identifier of the first device in response to said detecting; and
   issuing the request to determine the model information of the first device, wherein the request includes the network device identifier of the first device.

10. The method of claim 1, wherein the model information specifies a family name of the first device and a model name of the first device.

11. The method of claim 1, wherein the network device identifier of the first device is a media access control (MAC) address of the first device, and wherein the database information maps a plurality of MAC addresses of the other devices to the model information of the other devices.

12. A computer accessible storage medium storing program instructions executable by one or more processors to:
receive a request to determine model information of an unknown first device of a plurality of devices connected to a network, each of the plurality of devices having a corresponding network device identifier;
in response to receiving the request:
analyze a database to determine the model information of the first device, wherein the database includes database information that maps one or more of the plurality of network device identifiers to model information of one or more corresponding devices of the plurality of devices;
in response to determining a device identifier for the unknown first device is not already mapped to model information in the database, determining model information for the unknown first device without communicating with the unknown first device by:
extrapolating model information of the unknown first device based on portions of a device identifier associated with the request and the database information; and
determining a confidence level indicating a level of confidence that the extrapolated model information of the first device is correct;
return the extrapolated model information of the first device and the confidence level in response to the request.

13. The computer accessible storage medium of claim 12, wherein the program instructions are further executable by the one or more processors to:
add new information to the database that maps the network device identifier of the first device to the extrapolated model information of the first device.

14. The computer accessible storage medium of claim 13, wherein the program instructions are further executable by the one or more processors to:
subsequent to said adding the new information to the database, receive a change request to change the model information to which the network device identifier of the first device is mapped in the database, wherein the change request specifies different model information; and
change the database information to map the network device identifier of the first device to the different model information.

15. The computer accessible storage medium of claim 13, wherein the program instructions are further executable by the one or more processors to:
mark the new information added to the database to indicate that the model information to which the network device identifier of the first device is mapped was extrapolated from the database.

16. A system comprising:
one or more processors; and
memory storing program instructions, wherein the program instructions are executable by the one or more processors to:
receive a request to determine model information of a first device of a plurality of devices connected to a network, each of the plurality of devices having a corresponding network device identifier;
in response to communicating with the first device receiving the request:
analyze a database to determine the model information of the first device, wherein the database includes database information that maps one or more of the plurality of network device identifiers to model information of one or more corresponding devices of the plurality of devices;
in response to at least determining a device identifier for the unknown first device is not already mapped to any model information in the database, determine model information for the unknown first device without communicating with the unknown first device by whereby the system is configured to:
extrapolate model information of the unknown first device based on portions of a device identifier associated with the request and the database information; and
determine a confidence level indicating a level of confidence that the extrapolated model information of the first device is correct;
return the extrapolated model information of the first device and the confidence level in response to the request.

* * * * *

UNITED STATES PATENT AND TRADEMARK OFFICE
CERTIFICATE OF CORRECTION

Page 1 of 1

PATENT NO.         : 9,135,293 B1
APPLICATION NO.    : 13/897891
DATED              : September 15, 2015
INVENTOR(S)        : Kienzle et al.

It is certified that error appears in the above-identified patent and that said Letters Patent is hereby corrected as shown below:

In the Claims:

Column 18, Claim 16, Lines 23-24, please delete "in response to communicating with the first device receiving the request:" and substitute -- in response to receiving the request: --.

Signed and Sealed this
Second Day of February, 2016

Michelle K. Lee
*Director of the United States Patent and Trademark Office*